United States Patent [19]

Barrett, Jr.

[11] Patent Number: 4,541,870
[45] Date of Patent: Sep. 17, 1985

[54] INSULATING CEMENTITIOUS MIXTURE AND METHOD OF USE

[76] Inventor: Dave D. Barrett, Jr., 1416 F St., Lawton, Okla. 73501

[21] Appl. No.: 637,287

[22] Filed: Aug. 3, 1984

[51] Int. Cl.⁴ .............................................. C04B 7/356
[52] U.S. Cl. ........................................ 106/96; 106/99
[58] Field of Search ..................................... 106/96, 99

[56] References Cited

U.S. PATENT DOCUMENTS

| | | |
|---|---|---|
| 2,824,022 | 2/1958 | Sucetti . |
| 2,861,004 | 11/1958 | Sucetti ................................. 106/96 |
| 3,591,395 | 7/1971 | Zonsveld et al. . |
| 3,600,312 | 8/1971 | Bohland ............................... 106/96 |
| 3,713,856 | 1/1973 | McConnaughay .................. 106/96 |

OTHER PUBLICATIONS

Forta Fibre Research Paper, R. C. Zellers, P. E., Oct. 5, 1982.
The Construction Specifier, Dec. 1982, reprint of article entitled "Fiber Reinforced Concrete".
Forta Fibre Sales Brochure.
W. R. Grace & Co., Product Brochure G-231-R on Zonolite Vermiculites.
W. R. Grace & Co., Information Sheets on Zonolite Insulating Concrete.
ASTM Specification C332-82 entitled, "Lightweight Aggregates for Insulating Concrete".
Forta Fibre Spec-Data Sheet, Nov. 1983.
Forta Fibre Fact-Data Sheet.

*Primary Examiner*—Arthur P. Demers
*Attorney, Agent, or Firm*—Neal R. Kennedy

[57] ABSTRACT

A cementitious mixture including water-repellent vermiculite, polypropylene fibers and cement. A preferred embodiment utilizes: asphalt-coated, expanded vermiculite; collated, fibrillated polypropylene fibers; and non-shrinking Portland cement. Test data indicates a greatly increased compressive strength compared to previously known vermiculite insulating concretes. A prefabricated building panel utilizing the mixture of the present invention, and a method of manufacture thereof, are also disclosed. Calculated R values indicate good thermal insulating characteristics.

20 Claims, 4 Drawing Figures

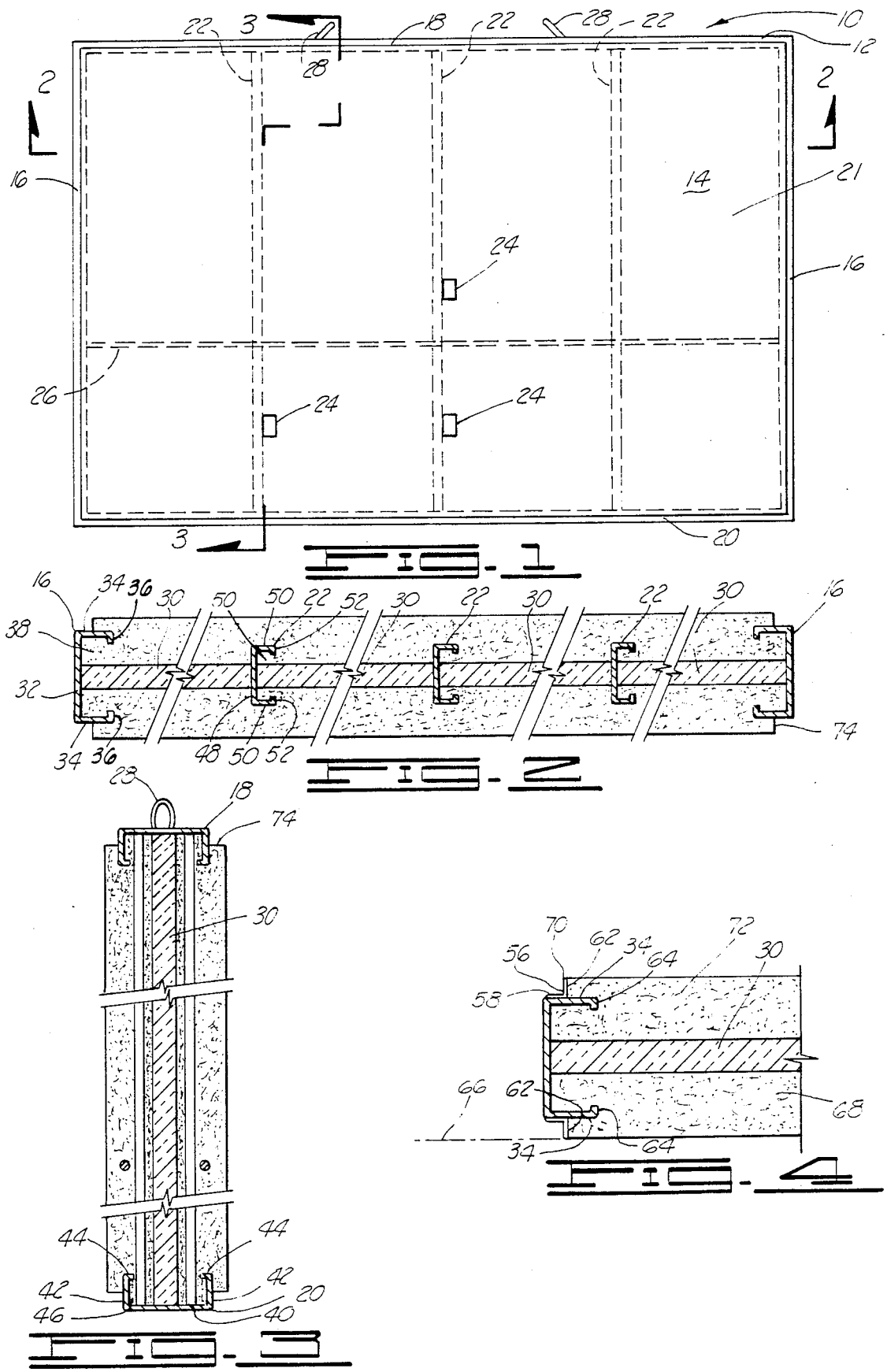

INSULATING CEMENTITIOUS MIXTURE AND METHOD OF USE

BACKGROUND OF THE INVENTION

1. Field of the Invention

This invention relates to cementitious mixtures and their use, and more particularly, but without limitation, to lightweight or insulating cementitious mixtures, structures formed therefrom and methods of use thereof.

2. Description of the Prior Art

Lightweight materials with good thermal insulating characteristics are desirable for use in building panels, and in particular, tilt-up wall panels. Use of lightweight aggregates in concrete have been used for such purposes, and the American Society for Testing and Materials has published ASTM Specification C322 entitled "Lightweight Aggregates For Insulating Concrete". This specification covers lightweight aggregates intended for use in concrete not exposed to weather, in which the prime consideration is the thermal insulating property of the resulting concrete. One problem with such materials is that the insulating aggregate greatly reduces the compressive strength of the concrete.

Specifically, vermiculite has been used in cementitious mixtures. For example, ASTM Specification C322, Group I covers one of two general types of lightweight aggregates, particularly aggregates prepared by expanding products such as perlite or vermiculite. The vermiculite in such aggregates provides the thermal insulating characteristics and is also used specifically because it will readily absorb and hold liquid water by capillary penetration. A material purporting to conform with ASTM Spec C332, Group I is sold under the name "Zonolite Insulating Concrete" by W. R. Grace & Company.

The strength of lightweight insulating concretes is not sufficient to be suitable for exterior surfaces. Also, the vermiculite in such materials will still absorb water which is unsatisfactory for exterior surfaces.

The use of polypropylene fibers to reinforce cementitious mixtures is disclosed in U.S. Pat. No. 3,591,395 to Zonsveld et al. Such fibers are sold under the name of "Forta Fibre" by Forta Fibre, Inc.

SUMMARY OF THE INVENTION

The present invention provides a cementitious mixture comprising a coated, insulating aggregate, a fibrous material and cement, and also provides a hardened material formed by mixing the cementitious mixture with water and a method of making a building panel with such material.

The coated, insulating aggregate used in the mixture is vermiculite coated with a film of water-repellent material, such as asphalt. The asphalt-coated vermiculite allows the hardened material to have a surface suitable for exterior surfaces and acts to provide a greater compressive strength than normal insulating concretes. However, the water-repellent feature of the coated vermiculite has prevented its use in a cementitious mixture with water added. Accordingly, water-repellent vermiculite may not be used in conventional cementitious mixtures; the fibrous material utilized in the present invention must also be present.

The preferred fibrous material is made of polypropylene, and the polypropylene fibers utilized in the mixture are collated, fibrillated, polypropylene fibers which form a fine lattice, or mesh, when mixed with cement and water. The fibers were developed originally to inhibit shrinkage and cracking in concrete. In addition to strengthening the material, the polypropylene fibers bind and distribute the water-repellent vermiculite in the mixture of the present invention.

Tests indicate the preferred mixture has significantly greater compressive strength than previous standard vermiculite-cement mixtures, mixtures utilizing standard vermiculite with polypropylene fibers, and a vermiculite, cement and sand mixture recommended for increased strength by a manufacturer of standard vermiculite.

The water-repellent film covering the vermiculite reduces the number of sharp edges which results in lower stress concentrations in the dried cement, thus lessening the likelihood of crack propagation which increases compressive strength. It is also theorized that the ductile, resilient nature of water-repellent coatings such as asphalt increases the ability of the material to withstand load.

The mixture of the present invention also results in a better surface finish than standard vermiculite insulating concretes, and is durable enough to be used for floors and exterior surfaces as well as interior walls.

In utilizing the mixture in a wall panel, a prefabricated, load-bearing frame is filled with the mixture which hardens into a solid panel. Insulating material may be placed in the center of the frame and enclosed by the hardened material. In a preferred embodiment of the frame, all structural members of the frame have a substantially C-shaped cross section opening inwardly. Intermediately spaced vertical support members also have such a cross-sectional configuration.

A method of manufacture of a prefabricated building panel is disclosed in which a perimeter lip is formed around each side of the frame. The frame, with the lips attached, is laid on a smooth surface and is partially filled with the hardenable material made from the mixture of the present invention. The insulating layer is then installed, and additional hardenable material is added to fill the center of the frame. After hardening, the panel may be lifted to a vertical position by lifting means.

Calculated R values for the wall panel made in accordance with the invention indicate excellent insulating characteristics, and flame spread tests show excellent fire resistance.

An object of the present invention is to provide an improved cementitious mixture.

Another object is to provide such an improved cementitious mixture for forming a hardened, lightweight, insulating material.

An additional object of the invention is to provide a lightweight insulating concrete suitable for exterior surfaces.

Another object of the invention is to provide a lightweight insulating concrete having greater compressive strength characteristics than previously known lightweight insulating concrete.

Still another object is to provide a material with excellent thermal insulating characteristics for use in building panels.

Another object is to provide a building panel material that is more resistant to fire than conventional concrete.

A further object is to provide a method of using such a cementitious mixture in a building panel utilizing a load-bearing frame.

Additional objects and advantages of the invention will become apparent as the following detailed description of the preferred embodiment is read in conjunction with the accompanying drawings which illustrate such preferred embodiments.

BRIEF DESCRIPTION OF THE DRAWINGS

FIG. 1 illustrates a building wall having a surface panel formed by hardening the mixture of the present invention.

FIG. 2 is a horizontal cross section taken along lines 2—2 in FIG. 1.

FIG. 3 is a vertical cross section taken along lines 3—3 in FIG. 1.

FIG. 4 shows a horizontal cross-sectional view illustrating a method of making a building panel utilizing the mixture of the present invention.

DETAILED DESCRIPTION OF THE PREFERRED EMBODIMENTS

The cementitious mixture of the present invention comprises a coated, lightweight aggregate, a fibrous material and cement. This dry mixture may be admixed with water to form a hardenable material which, when hardened, is lightweight, has desirable thermal insulating characteristics, and is suitable for wall structures and also floors and exterior surfaces.

The coated, lightweight aggregate used in the present invention is a water-repellent vermiculite. This vermiculite is not the water-absorbing material used in previously known mixtures for insulating concretes. Instead, the vermiculite used is an expanded vermiculite which has been coated with a film of water-repellent material, preferably, but not limited to, a bituminous material such as asphalt. This greatly reduces the water-holding capacity of the vermiculite, and the treated material sheds water. Normally, water-repellent vermiculite is immiscible in water, and when mixed with cement and water will simply float to the top before the mixture hardens. In fact, prior to this invention, the art has taught that water-repellent vermiculite should not be mixed with water or a cement-water mixture, because conventional mixtures require a water-absorbing material.

A water-repellent vermiculite suitable for use in the present invention, and a method of manufacturing such vermiculite, are described in U.S. Pat. No. 2,824,022 to Sucetti. One such material is available under the name "Masonry Zonolite" from W. R. Grace & Company. This water-repellent vermiculite has been used in the past as a fill insulation in wall openings, such as in masonry walls, where there is a danger of water leakage that would damage water-absorbing, or other hydrophillic, insulation.

The fibrous material utilized in the mixture of the present invention preferably consists of collated, fibrillated, polypropylene fibers such as those which have been developed by Forta Fibre, Inc. to be added to concrete mixtures to inhibit shrinkage and cracking, although it is not intended that the invention be limited to these materials. These fibers are formed into pre-stressed lattice bundles. When the fibers are added to the mix, the mixing action causes the bundles to open to a fine lattice, or mesh, form. The mixing also causes the fibers to spread uniformly through the mix. The fibers are designed to act to reinforce potential crack zones by strengthening microscopic flaws in the concrete.

In addition to strengthening the hardened material, the present invention utilizes the polypropylene fibers to bind and distribute water-repellent vermiculite in a mixture of cement and water as it is mixed and cured to a hardened mass, preventing the vermiculite from floating to the top. This allows the water-repellent vermiculite to be used despite the contrary teachings of the art. Thus, the polypropylene fibers are utilized in a novel manner, and a method of mixing water-repellent vermiculite with cement and water is made available. The advantages of such a mixture will be evident after studying the test results disclosed herein.

Collated, fibrillated, polypropylene fibers are manufactured in a variety of lengths and are known to be available in lengths from $\frac{3}{4}$ inch to $2\frac{1}{2}$ inches. It has been found by experimentation that longer lengths of fibers will better hold the water-repellent vermiculite. In a preferred embodiment, the average length of the fibers is approximately $2\frac{1}{4}$ inches, but the present invention is not limited to fibers of such length.

To reduce the possibility of cracking of the hardened material, a non-shrinking Portland cement is utilized in the preferred embodiment. However, a mixture can be made utilizing the fibers and water-repellent vermiculite in standard cements as well, and therefore, the present invention is not limited to non-shrinking Portland cement.

In preparing the mixture to make the hardened material, the dry mixture of coated aggregate, fibrous material and cement is mixed with water in the manner of any conventional cementitious mixture. A mixing time of approximately 10 to 30 minutes is preferable, although other times may be suitable depending on the degree of agitation and the relative concentration of the components of the mixture.

For the dry mixture, the range of the concentrations of the components as a percentage by weight of the combined vermiculite, fiber and cement believed to be satisfactory are as follows:

Water-repellent vermiculite: Approximately 9% to 56%

Polypropylene fibers: Approximately 0.7% to 2%

Cement: Approximately 43% to 89%

The ratio of dry-mixture-to-water by weight ranges from approximately 1:2.3 to 1:10.2, depending upon how wet a mixture is desired. It is possible that mixtures outside these ranges may also achieve satisfactory results, and therefore, it is not intended that the present invention be limited by the range of dry mixtures or the dry-mixture-to-water ratios listed above.

As a result of many tests, a preferred dry mixture for the present invention has been empirically determined. The concentration of the various components in the preferred dry mixture is as follows:

Approximately 17.3% by weight of asphalt-coated, expanded vermiculite

Approximately 1.4% by weight of collated, ribrillated, polypropylene fibers

Approximately 81.3% by weight of non-shrinking Portland cement

This dry mixture is mixed with water to form a hardenable material. The preferred dry-mixture-to-water weight ratio range is approximately 1:4.3 to 1:7.2 with approximately 1:5.8 considered optimum, but other ratios may also achieve satisfactory results.

Using the material concentration relationships of the preferred mixture, approximately one cubic yard of hardened material is obtained by a dry mixture containing approximately 20 pounds of water-repellent vermiculite, approximately 1.6 pounds of polypropylene fibers and approximately 94 pounds of non-shrinking Portland cement, and then mixing with water. Approximately 60 to 100 gallons (500.5 to 834.2 pounds) of water may be used, but preferably, approximately 80 gallons (667.4 pounds) of water are used with the mixture.

Coarse aggregates, such as sand or gravel, as are commonly used in cementitious mixtures, may be added to the mixture of the present invention as desired to provide different textures and for additional strength of the hardened material.

Tests indicate that the preferred mixture of the present invention results in a hardened material of significantly greater compressive strength than previously known vermiculite-cement mixtures. Table I shows the results from one series of tests after an aging time of seven days, and Table II shows data on the same materials after an aging time of twenty-four days. In Tables I and II, the materials for the test samples are identified as follows:

A—the preferred mixture of the present invention
B—vermiculite insulating concrete following the vermiculite manufacturer's recommendations and ASTM Specification C332, Group I, using normal, expanded vermiculite and no polypropylene fibers
C—the standard vermiculite insulating concrete in test material B with the addition of polypropylene fibers
D—the mixture in test material B with sand added as recommended by the manufacturer of the vermiculite for increasing the strength of the material

TABLE I

| Test Material | Age Time: 7 days Compressive Strength, Pounds Per Cubic Inch |
| --- | --- |
| A | 380 |
| B | 160 |
| C | 160 |
| D | 185 |

TABLE II

| Test Material | Age Time: 24 days Compressive Strength, Pounds Per Cubic Inch |
| --- | --- |
| A | 620 |
| B | 215 |
| C | 280 |
| D | 290 |

Table III shows results on the preferred mixture performed in another series of tests. Samples 1 and 2 in Table III indicate separate tests on the same material after aging 24 days.

TABLE III

| Age Time, Days | Test Material A Compressive Strength, Pounds Per Cubic Inch |
| --- | --- |
| 6 | 478 |
| 24 (Sample 1) | 548 |
| 24 (Sample 2) | 584 |

As can be seen, both series of tests showed comparable compressive strength for the test samples made from the material of the present invention.

The water-repellent film covering the water-repellent vermiculite reduces the number of sharp edges on the vermiculite particles. When mixed with the cement, the smoother edges of the water-repellent vermiculite result in reduced stress concentrations in the cement, thus reducing the likelihood of crack propagation which increases compressive strength. It is theorized that the ductile, resilient nature of some water-repellent coatings such as asphalt results in an increased ability of the hardened material to withstand loading. It is also theorized that the heat of hydration generated as the cement sets causes the asphalt coating to become tacky which helps bind the vermiculite to the hardening cement. At any rate, the present invention results in a vermiculite-cement material with demonstrably greater strength than previously known in the art.

Another positive result of the present mixture is a better surface finish. Standard vermiculite insulating concrete has a chalky, powdery surface when hardened and is not durable enough for exterior surfaces. Material formed from the mixture of the present invention has no chalky finish. In addition to being stronger, the material has a smoother and slicker finish when dried. Nails can be driven into the surface and it can be sanded and varnished. Surface features can be routed and carved into the finished surface easily. The finished surface is durable and can be used as a floor surface as well as for wall or ceiling and roof surfaces. The material is also satisfactory for exterior surfaces as well as interior surfaces.

Referring now to the drawings, and particularly FIG. 1, a prefabricated wall panel utilizing the mixture of the present invention is generally designated by the numeral 10. A load-bearing frame 12 is filled with the mixture which, when cured or aged, hardens into a solid panel 14.

Frame 12 is of substantially rectangular configuration having a pair of vertical columns 16 and an upper horizontal beam 18 and a lower horizontal beam 20 defining a panel-shaped central opening 21. Intermediate vertical support members 22 may be fixedly installed in central opening 21 between horizontal beams 18 and 20 as necessary. Frame 12 and vertical support members 22 thus form a load-bearing structure before the mixture is poured to form panel 14. In this wall panel, the hardened material is not actually required as a load-bearing component of the structure, but does help contain and brace vertical support members 22.

Prior to pouring the mixture, such items as electrical receptacle boxes 24 and reinforcing bar 26 may be placed in the frame in a manner commonly known in the art. Electrical conduit (not shown) connected to receptacle boxes 24 and lifting means 28 may also be preinstalled.

Referring now to the horizontal cross-section view of FIG. 2, it can be seen that a layer of insulating material 30 is placed between vertical columns 16 and the adjacent vertical support member 22 and also between adjacent vertical support members 22. As shown in FIG. 3, insulating layer 30, such as thermal or sound insulation, extends vertically between lower horizontal beam 20 and upper horizontal beam 18.

Referring again to FIG. 2, each vertical column 16 has a substantially C-shaped cross section having a transverse member 32 with a first flange 34 perpendicular to transverse member 32 at opposite ends thereof and extending inwardly with respect to frame 12. At an end of each of these first flanges 34 opposite transverse member 32 is a second flange 36. Second flange 36 extend toward one another and are substantially parallel to transverse member 32. Thus, each vertical column 16 defines a longitudinal channel 38 which opens toward central opening 21 of frame 12.

Similarly, as shown in FIG. 3, horizontal beams 18 and 20 each have a transverse member 40, first flanges 42 and second flanges 44 to define a longitudinal channel 46 which opens toward central opening 21 of frame 12.

Referring again to FIG. 2, it can be seen that vertical support members 22 also have a substantially C-shaped cross-sectional configuration, similar to that of vertical columns 16, except that vertical support members 22 are smaller. Each vertical support member 22 has a transverse member 48, first flanges 50 extending perpendicularly from the transverse member and a second flange 52 at an end of first flange 50 opposite transverse member 48. Second flanges 52 extend toward one another and are substantially parallel to transverse member 48. Each vertical support member 22 thus defines a longitudinal channel 54, and the opening direction of the channel is purely arbitrary. Transverse member 48 of vertical support member 22 is dimensioned such that it will fit between second flanges 44 of horizontal beams 18 and 22, as best shown in FIG. 3.

Referring now to FIG. 4, the method of manufacture of the prefabricated building panel utilizing the mixture of the present invention will be explained. Angle iron piece 56 has a first flange 58 which is temporarily attached to the external surface of first flanges 34 of both vertical columns 16. First flanges 58 of angle iron piece 56 are outwardly disposed with respect to frame 12. A second flange 60 of angle iron piece 56 thus extends transversely away from frame 12. Similar angle iron pieces (not shown) are temporarily attached to first flanges 42 of horizontal beams 18 and 20. All the angle iron pieces are joined at the corners of frame 12 such that second flanges 60 form a perimeter lip 62 around each side of the frame, outwardly spaced from inner perimeter edge 64 of frame 12.

Frame 12, with lip 62 attached to each side thereof, is laid flat on a smooth surface 66 such that it rests on one of said lips. Central opening 21 of frame 12 is partially filled with the mixture of the present invention to form a first hardened layer 68. Note that longitudinal channels 38 of vertical columns 16, longitudinal channels 46 of horizontal beams 18 and 20, and longitudinal channels 54 of vertical support members 22 are partially filled with the mixture, thus tying and interlocking first layer 68 into the load-bearing structure. If reinforcing bar 26 is used, first layer 68 is preferably sufficient to totally enclose the reinforcing bar. Also electrical receptacle boxes 24 and interconnecting conduit are installed prior to pouring the hardenable material.

Insulating layer 30 is placed on hardened layer 68 in central opening 21 of frame 12 as hereinbefore described. Additional reinforcing bar 26 is installed as desired, and the mixture is poured on top of insulating layer 30 up to a level even with a top surface 70 of upper angle iron lip 62 to form a second hardened layer 72. This also fills the remaining portion of longitudinal channels 38, 46 and 54 to tie and interlock second layer 72 into the load-bearing structure. Before second layer 72 hardens completely, it can be textured as desired in a manner known in the art.

After hardening, angle iron pieces 56 are removed. Thus, hardened layers 68 and 72 are formed to have a transverse edge 74 which extends away from frame 12 as best shown in FIGS. 2 and 3.

Once the pouring and hardening processes are complete, panel 10 can be lifted to a vertical position by lifting means 28 and installed in a building as desired.

The wall panel described above is but one embodiment of a building panel utilizing the mixture of the present invention, and it should be understood that the mixture can be used in many other building structures previously known in the art to provide a stronger, more durable panel than normal lightweight insulating concrete.

A coarse aggregate, such as gravel, may be included in the mixture to provide a rock-wall finish on the wall panel described above. Other coarse aggregates may also be used for color, surface finish and strength as desired.

Although using water-repellent vermiculite, the present invention retains the advantage of the excellent thermal insulating characteristics of standard vermiculite concrete mixtures.

For example, but not by way of limitation, calculated R values for a building panel of the embodiment described above, wherein the insulating layer is a thermal insulation, and having the indicated transverse dimensions, are as follows:

| Inside air film | 0.68 |
| 3" thick, first hardened layer | 7.20 |
| 2" thick, urethane thermal insulation layer | 12.00 |
| 3" thick, second hardened layer | 7.20 |
| Outside air film | 0.17 |
| Total R Value | 27.25 |

Another wall panel, utilizing no insulating layer in the center, would have a calculated R value as follows:

| Inside air film | 0.68 |
| 8" thick, hardened layer | 19.20 |
| Outside air film | 0.17 |
| Total R Value | 20.05 |

Obviously, even without an additional thermal insulating layer in the center, the material of the present invention has excellent thermal insulating characteristics.

Flame spread tests conducted in accordance with ASTM Specification E84, "Flame Spread Tests of Insulating Concrete Panels," show excellent fire resistance for the hardened material made from the mixture of the present invention. The tests were conducted on a solid four-inch thick panel having no insulating layer imbedded therein. The results were as follows:

Flame Spread: 0

Smoke Developed: 0

Ignition: None

There was some charring. However, the material did not explode and break up as conventional concrete will do when subjected to such testing.

It can be seen that the vermiculite cementitious mixture of the present invention, the hardened material formed by mixing the dry mixture with water and curing, the method of manufacturing a wall panel utilizing the mixture, and other methods of use of the mixture, are well adapted to carry out the objects and attain the ends and advantages mentioned, as well as those inherent therein. While presently preferred embodiments of the mixture, methods of use of the mixture, and of a building panel, have been described for the purposes of this disclosure, numerous changes in the mixture and the construction and arrangement of parts in the building panel can be made by those skilled in the art. All such changes are encompassed within the scope and spirit of this invention as defined by the appended claims.

What is claimed is:

1. A cementitious mixture comprising:
    a coated, insulating aggregate;
    cement; and
    a fibrous material for binding and distributing said aggregate in said cement when admixing said mixture with water.

2. The mixture of claim 1 wherein:
    said coated, insulating aggregate comprises water-repellent vermiculite; and
    said fibrous material comprises collated, fibrillated polypropylene fibers.

3. The mixture of claim 2 wherein said water-repellent vermiculite is an asphalt-coated, expanded vermiculite.

4. The mixture of claim 2 wherein said fibers have an average length of approximately 2½ inches.

5. The mixture of claim 2 wherein said mixture contains:
    said water-repellent vermiculite in a range of approximately 9 to 56 percent by weight of a total weight of said vermiculite, fibers and cement;
    said polypropylene fibers in a range of approximately 0.7 to 2 percent by weight of said total weight of said vermiculite, fibers and cement; and
    said cement in a range of approximately 43 to 89 percent by weight of said total weight of said vermiculite, fibers and cement.

6. The mixture of claim 5 wherein:
    said water-repellent vermiculite is approximately 17.3 percent by weight of said total weight of said vermiculite, fibers and cement;
    said polypropylene fiber is approximately 1.4 percent by weight of said total weight of said vermiculite, fibers and cement; and
    said cement is approximately 81.3 percent by weight of said total weight of said vermiculite, fibers and cement.

7. The mixture of claim 1 wherein said cement is a non-shrinking Portland cement.

8. The mixture of claim 1 further comprising a coarse aggregate.

9. A hardened material produced by curing a mixture comprising:
    water-repellent vermiculite;
    cement;
    water; and
    a fibrous material for binding and distributing said vermiculite in said cement and water as it is mixed and cured.

10. The material of claim 9 wherein said water-repellent vermiculite is an expanded vermiculite, asphalt-coated to be substantially water-repellent.

11. The material of claim 9 wherein said cement is a non-shrinking Portland cement.

12. The material of claim 9 wherein said fibrous material comprises collated, fibrillated polypropylene fibers.

13. The material of claim 12 wherein said fibers have an average length of approximately 2½ inches.

14. The material of claim 9 wherein:
    said water-repellent vermiculite, cement and fibrous material define a dry mixture having:
        said water-repellent vermiculite in a range of approximately 9 to 56 percent by weight of a total weight of said dry mixture;
        said cement in a range of approximately 43 to 89 percent by weight of said total weight of said dry mixture; and
        said fibrous material in a range of approximately 0.7 to 2 percent by weight of said total weight of said dry mixture; and
    said dry mixture is admixed with said water in a dry-mixture-to-water weight ratio ranging approximately from 1:2.3 to 1:10.2.

15. The material of claim 14 wherein:
    said water-repellent vermiculite is approximately 17.3 percent by weight of said total weight of said dry mixture;
    said cement is approximately 81.3 percent by weight of said total weight of said dry mixture;
    said fibrous material is approximately 1.4 percent by weight of said total weight of said dry mixture; and
    said dry-mixture-to-water weight ratio ranges approximately from 1:4.3 to 1:7.2.

16. The material of claim 15 wherein said dry-mixture-to-water weight ratio is approximately 1:5.8.

17. The material of claim 9 wherein said mixture further comprises a coarse aggregate.

18. A hardened material produced by curing a mixture comprising:
    asphalt-coated, expanded vermiculite in a concentration of approximately 20 pounds per approximate cubic yard of said hardened material;
    collated, fibrillated polypropylene fibers in a concentration of approximately 1.6 pounds per approximate cubic yard of said hardened material;
    non-shrinking Portland cement in a concentration of approximately 94 pounds per approximate cubic yard of said hardened material; and
    water in a concentration of approximately 60 to 100 gallons per approximate cubic yard of said hardened material.

19. The material of claim 18 wherein said water concentration is approximately 60 gallons per approximate cubic yard of said hardened material.

20. The material of claim 18 wherein said fibers have an average length of approximately 2½ inches.

* * * * *